US011150943B2

(12) United States Patent
Rhee et al.

(10) Patent No.: US 11,150,943 B2
(45) Date of Patent: Oct. 19, 2021

(54) ENABLING A SINGLE CONTEXT HARDWARE SYSTEM TO OPERATE AS A MULTI-CONTEXT SYSTEM

(71) Applicant: Intel Corporation, Santa Clara, CA (US)

(72) Inventors: Changwon D. Rhee, Rocklin, CA (US); Zhijun R. Lei, Portland, OR (US); Ping Liu, Sunnyvale, CA (US); Kin-Hang W. Cheung, San Jose, CA (US); Gomathi Ramamurthy, Bangalore (IN); Naiqian Lu, Fremont, CA (US); Sang-Hee Lee, Santa Clara, CA (US); Wei Xiong, Fremont, CA (US); Richard Gui Xie, Folsom, CA (US); Saimanohara S. Alapati, Folsom, CA (US); Jay M. Patel, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 169 days.

(21) Appl. No.: 15/482,912

(22) Filed: Apr. 10, 2017

(65) Prior Publication Data

US 2018/0293097 A1 Oct. 11, 2018

(51) Int. Cl.
| G06F 9/48 | (2006.01) |
| G06F 9/50 | (2006.01) |
| G06F 9/46 | (2006.01) |
| G06T 1/20 | (2006.01) |
| G09G 5/36 | (2006.01) |

(52) U.S. Cl.
CPC .............. *G06F 9/4881* (2013.01); *G06F 9/46* (2013.01); *G06F 9/505* (2013.01); *G06F 9/5044* (2013.01); *G06T 1/20* (2013.01); *G09G 5/363* (2013.01); *G06F 9/5083* (2013.01); *G06T 2200/28* (2013.01)

(58) Field of Classification Search
None
See application file for complete search history.

(56) References Cited

U.S. PATENT DOCUMENTS 6,310,857 B1 * 10/2001 Duffield ............. H04Q 11/0478
370/232
6,952,211 B1 * 10/2005 Cote ........................ G06T 1/20
345/473

(Continued)

FOREIGN PATENT DOCUMENTS

| CA | 2691304 A1 * 7/2011 ............. H04N 5/222 |
| CN | 105160349 A * 12/2015 |
| WO | WO-2009078743 A1 * 6/2009 ........... H04N 19/577 |

OTHER PUBLICATIONS

Wang et al., Exploiting Concurrent Kernel Execution on Graphics Processing units, 2011, IEEE, pp. 24-32 (Year: 2011).*

(Continued)

*Primary Examiner* — Abu Zar Ghaffari
(74) *Attorney, Agent, or Firm* — Trop, Pruner & Hu, P.C.

(57) ABSTRACT

Independent workloads may be grouped together into a single super workload. This super workload is dispatched to a single context hardware system that does not run an operating system. This effectively creates a multi-context system out of a single context hardware processor.

29 Claims, 19 Drawing Sheets

(56) References Cited

U.S. PATENT DOCUMENTS

| | | | | |
|---|---|---|---|---|
| 7,234,139 | B1* | 6/2007 | Feinberg | G06F 9/45504 718/1 |
| 7,777,748 | B2* | 8/2010 | Bakalash | G06T 1/20 345/505 |
| 8,095,782 | B1* | 1/2012 | Danskin | G06F 9/461 712/228 |
| 8,108,879 | B1* | 1/2012 | Garlick | G06F 9/52 718/108 |
| 8,189,061 | B1* | 5/2012 | Linzer | H04N 5/23254 348/14.02 |
| 8,294,714 | B1* | 10/2012 | Bakdash | G06T 15/00 345/419 |
| 8,593,467 | B2* | 11/2013 | Schreyer | G06T 15/005 345/505 |
| 8,683,184 | B1* | 3/2014 | Lew | G06F 3/14 345/504 |
| 9,132,352 | B1* | 9/2015 | Rabin | A63F 13/30 |
| 9,773,050 | B2* | 9/2017 | Wang | G06F 16/26 |
| 9,804,846 | B2* | 10/2017 | Bradbury | G06F 9/3851 |
| 9,916,162 | B2* | 3/2018 | Gupta | G06F 9/3851 |
| 9,984,430 | B2* | 5/2018 | Surti | G06T 1/20 |
| 10,437,637 | B1* | 10/2019 | Koneru | G06F 8/44 |
| 2002/0063704 | A1* | 5/2002 | Sowizral | G06T 15/005 345/419 |
| 2006/0143350 | A1* | 6/2006 | Miloushev | G06F 9/5016 710/242 |
| 2006/0143359 | A1* | 6/2006 | Dostert | G06F 9/544 711/6 |
| 2007/0103475 | A1* | 5/2007 | Huang | G06T 15/005 345/522 |
| 2007/0223882 | A1* | 9/2007 | Kuno | G06F 3/14 386/280 |
| 2008/0123672 | A1* | 5/2008 | Wilkinson | H04L 49/35 370/412 |
| 2008/0192063 | A1* | 8/2008 | Liao | G06T 15/005 345/582 |
| 2008/0204468 | A1* | 8/2008 | Li | G06T 1/20 345/582 |
| 2009/0210649 | A1* | 8/2009 | Wan | G06F 12/109 711/170 |
| 2010/0110083 | A1* | 5/2010 | Paltashev | G06F 9/30072 345/506 |
| 2011/0126202 | A1* | 5/2011 | Krauss | G06F 9/485 718/102 |
| 2011/0131351 | A1* | 6/2011 | Noeldner | G06F 12/00 710/52 |
| 2011/0161976 | A1* | 6/2011 | Alexander | G06F 9/52 718/104 |
| 2012/0162250 | A1* | 6/2012 | Glen | G09G 5/363 345/629 |
| 2013/0033506 | A1* | 2/2013 | Schreyer | G06T 15/005 345/506 |
| 2013/0050254 | A1* | 2/2013 | Tran | G06F 3/14 345/629 |
| 2014/0123146 | A1* | 5/2014 | Barrow-Williams | G06F 9/5033 718/102 |
| 2014/0328400 | A1* | 11/2014 | Puri | H04N 19/176 375/240.13 |
| 2015/0206272 | A1* | 7/2015 | Perelygin | G06T 1/60 345/505 |
| 2016/0062947 | A1* | 3/2016 | Chetlur | G06F 17/153 708/420 |
| 2016/0163016 | A1* | 6/2016 | Gould | G06F 9/3009 345/522 |
| 2017/0180800 | A1* | 6/2017 | Mayrand | H04N 21/44218 |

OTHER PUBLICATIONS

Cook, S., "CUDA Programming," CUDA Hardware Overview, Chapter 3, dx.doi.org/10.1016/B978-0-12-415933-4.00003-X, Elsevier, Inc. 2013, pp. 37-52.

Goodfellow, I., et al., "Adaptive Computation and Machine Learning Series," Chapter 5, Nov. 18, 2016, pp. 98-165.

Junkins, S., "The Compute Architecture of Intel Processor Graphics Gen9", Ver. 1, Aug. 14, 2015 (22 pgs.).

Ross, J., et al., "Intel Processor Graphics: Architecture & Programming," PowerPoint presentation, Aug. 2015 (78 pgs).

Wilt, N., The CUDA Handbook: A Comprehensive Guide to GPU Programming, Pearson Education, 2013, pp. 41-57.

* cited by examiner

ENABLING A SINGLE CONTEXT HARDWARE SYSTEM TO OPERATE AS A MULTI-CONTEXT SYSTEM

BACKGROUND

Context refers to the number of workloads that a system can process at a time. In a single context multicore system, many execution units or cores can run in parallel. Generally these types of multicore systems do not run system software or use operating systems and their hardware cannot support multiple contexts. Moreover, some systems that run system software or that use operating systems still may not support multiple contexts.

A multi-core multi-context system uses a multi-tasking operating system and can run multiple workloads in parallel based on software or hardware. However, certain applications are not amenable to using multi-tasking operating systems. One example of such a specialty processor is a graphics processing unit that operates on only one workload at a time. These single context multicore processors usually work on one frame at a time.

Ideally, to be most efficient, all the execution units in a multicore processor are used at every instance of time. However, some critical applications, such as a video encoder, have a limited amount of parallelism defined by the algorithm and only require a limited number of execution units to handle the workload, although additional execution units are commonly available in conventional graphics processing units. If the number of execution units available in the multicore system is greater than the number required to perform the operation, then the system is underutilized. Not only is the efficiency of the system lower than it could be but the performance scalability cannot be achieved even if more execution units are added to the system.

While graphics processing unit underutilization can be addressed in various techniques, those techniques all have drawbacks. For example, the low utilization may be solved by changing the algorithm to yield more parallelism. This may be done by breaking the spatial dependencies within a frame between blocks of pixels. However, since the neighboring results cannot be used for the current block's processing, the quality of the result is decreased. To minimize the quality degradation, parallelism is still limited, resulting in underutilization of execution units and performance scalability problems.

Multi-context processing capability may be added via hardware but with greater cost. But even with a hardware based multiple context processor, depending on the workload size, execution unit utilization and performance scalability problems are not completely solved.

BRIEF DESCRIPTION OF THE DRAWINGS

Some embodiments are described with respect to the following figures.

DETAILED DESCRIPTION

Figure 1:
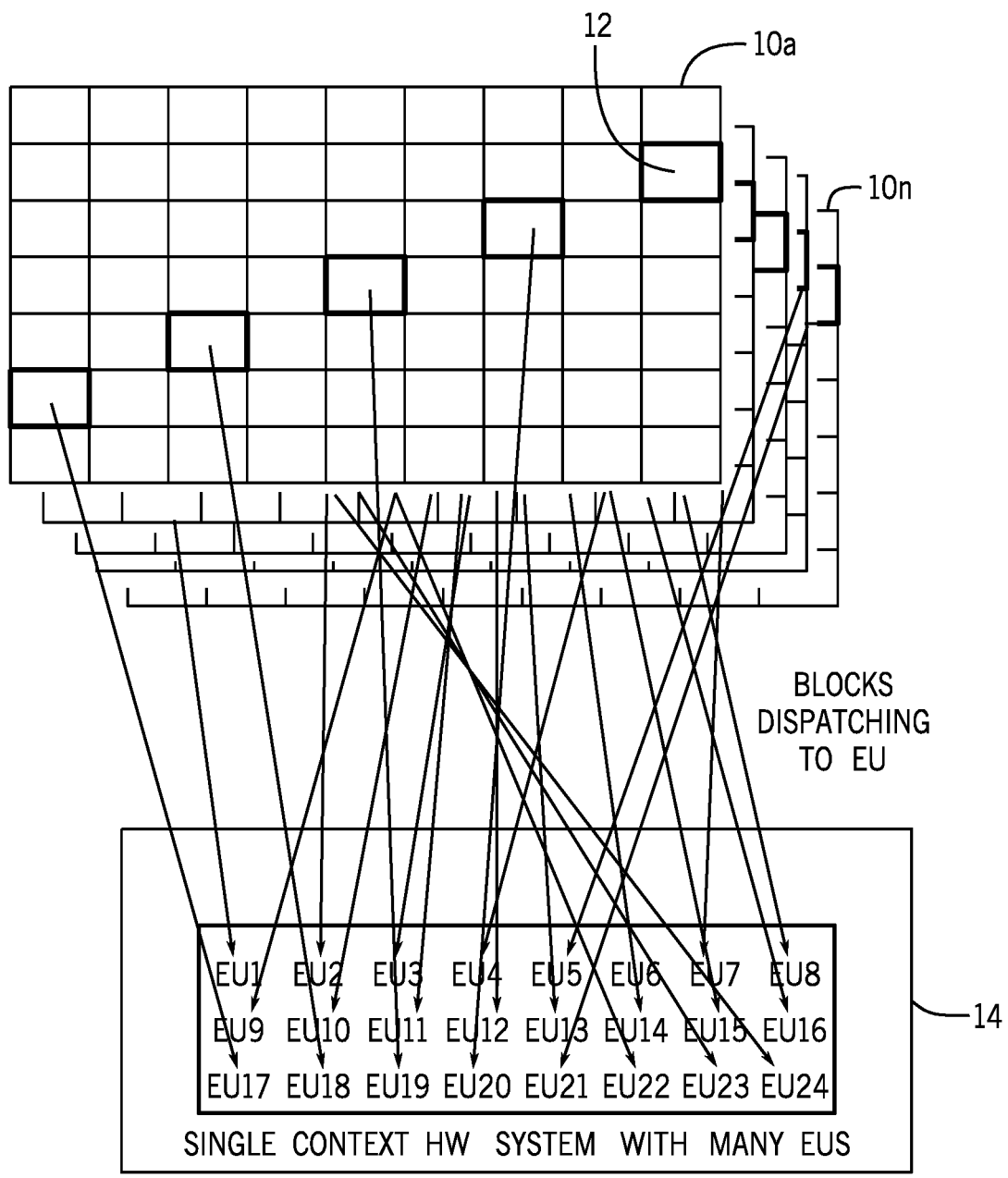
FIG. 1 is a simplified depiction of one embodiment.

In some embodiments, independent workloads may be grouped together into a single super workload. This super workload is dispatched to a single context hardware system that does not run an operating system. This effectively creates a multi-context system out of a single context hardware processor. In one embodiment multiple frames may be encoded in single context hardware.

In some cases maximum utilization and scalable performance can be achieved while the number of silicon gates may be reduced. In addition, hardware development and validation efforts may be reduced in some embodiments.

Depending on the number of execution units in the system, the size of the super workload can be adjusted by software by simply controlling the number of individual workloads to be grouped.

Then the super workload is dispatched substantially like any regular workload with a few differences. One difference with the super workload may be that frame size is artificially increased to accommodate multiple workloads inside the super workload. Also some ways may be provided to identify the individual constituent workloads within the super workload.

In some cases, the single context multicore processor may be effectively converted into a multi-context, multicore processor using software if a hardware solution is not possible.

Once the super workload is dispatched and distributed among all the execution units, each of the individual workloads identify themselves using a workload identifier and start to load their own sets of inputs. Also the workload identifier and the sets of inputs can be used to identify the type of logic and algorithm to execute, if the super workload consists of heterogeneous workloads.

As an example, a super workload can be formed by concatenating N individual frames into one larger workload. Since N independent frames are used, the parallelism is naturally increased by a factor of N.

If the available hardware is capable of interleaving the dispatches so that N frames inside the larger super frame can be dispatched in round robin fashion in one embodiment, this effectively enables all N workloads to be executed together, simultaneously achieving complete hardware utilization in some embodiments.

The super workload can be created in various ways depending on hardware capabilities. If the hardware does not have the capabilities needed to create a super workload, then a software method can be used. For example a queue of jobs can be created in memory that consists of interleaved blocks from individual workloads. The first job in a queue may be for a workload number 1, block number 1, the next job in the queue may be for workload number 2, block number 1, the next job in the queue may be for workload number 1, block number 2 and the next job may be for workload number 2, block number 2, and so on.

Then a combined super frame combined frame is dispatched block by block as if it were a regular frame. As the execution units begin to process the blocks, each execution unit polls a job queue located in memory to obtain the workload identifier number as well the block number. This information may be used to execute the specific application.

The super workload allows software to control the number of scalable workloads, yielding higher utilization of the hardware as well as scalable performance in some embodiments.

One alternative is to use a conventional approach which can have utilizations as low as a single digit utilization percentage. Since these systems are already underutilized, adding more execution units to them does not provide any performance scalability. For example, if a frame consists of 9×7 blocks, then five blocks of pixels can be executed in parallel since only five execution units are occupied while the remaining 19 execution units are idle, and so utilization is about twenty percent.

Another alternative is to artificially increase parallelism inside the workloads so that more execution units can be used at a time. For example in the encoder motion estimation stage, all dependencies between blocks can be eliminated so that all the blocks can be dispatched and processed concurrently. Although all the available execution units may be utilized, there is a corresponding loss of quality. As more parallelism is created by artificially breaking dependencies, there will be more quality losses. For this reason, such parallelism is limited by algorithm developers and this method still cannot solve the utilization and performance scalability issues. The result is loss of quality in some cases and/or underutilization.

In some embodiments, no algorithm change is needed to improve parallelism. Instead the parallelism is obtained by combining multiple independent workloads. The size of the super workload can be controlled by software and it can be tuned to the optimal level for a specific system's capabilities in order to achieve the maximum utilization and to realize the scalable performance in some embodiments.

Thus referring to FIG. 1, N different workloads 10a-10n in a form of N different frames may be operated on in parallel. Since there are five parallel blocks 12 in each frame, indicated by the dark rectangles, the number of total of parallel blocks is higher than the 24 available execution units and hence 100% utilization is achieved in this single context system 14 with many execution units.

In general when the number of execution units is increased by a factor of x, the number of concurrent frames can be increased by the same factor. Hence scalable performance can be achieved in some embodiments.

Since it takes the same amount of time to process N frames as one frame, the effective processing time is reduced to 1/N of a single frame processing time N and the frames per second may be increased by a factor of N in some embodiments.

As an example of the performance gain possible from a video encoder application, an Advanced Video Coder (AVC) encoder was selected and a super workload was created by combining multiple frames into a single workload. The performance was measured using a real system. With two frame encodings, 1.8× performance gain was achieved over single frame encoding. With three frame encoding, a 2.5× performance gain over a single frame encoding was achieved.

Figure 2:
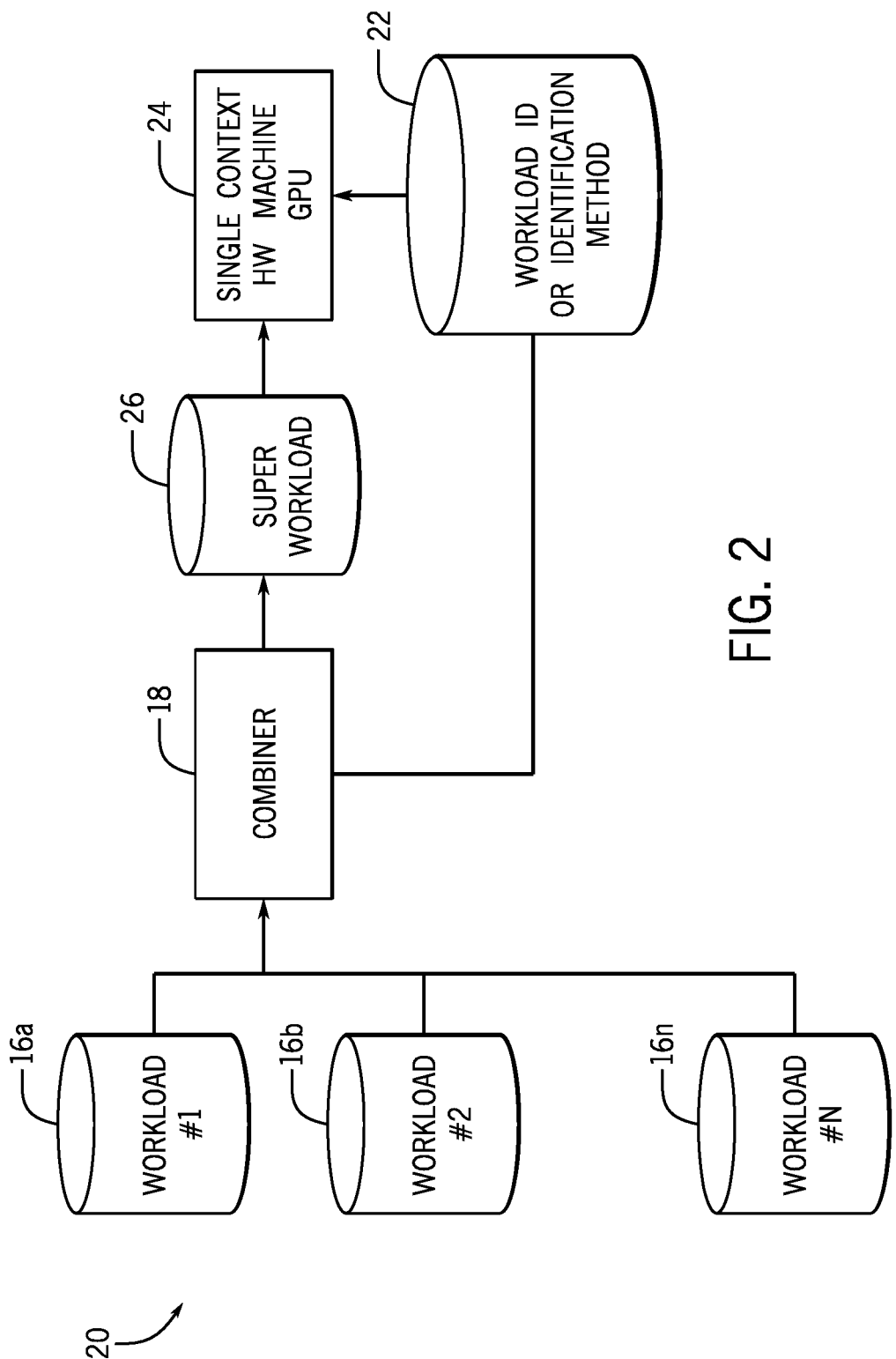
FIG. 2 is a flow chart for a software embodiment.

Referring to FIG. 2, a sequence 20 for creating a super workload in a single context hardware may be implemented in software, hardware or firmware. In software and firmware embodiments it may be implemented by non-transitory computer readable instructions stored in one or more non-transitory computer readable media such as magnetic, optical or semiconductor storage.

Since multiple workloads are running concurrently, a software based multi-context system may be enabled using single context hardware. The workload combiner 18 combines the workloads 16a-16n. The combiner may be hardware capability dependent. Once a method of combining is chosen during design time based on capabilities, a workload identifier indicated at 22 is determined and used during an execution to create this single context hardware machine graphics processing unit (GPU) 24 that operates as if it were a multi-context machine using the super workload 26.

Figure 3:
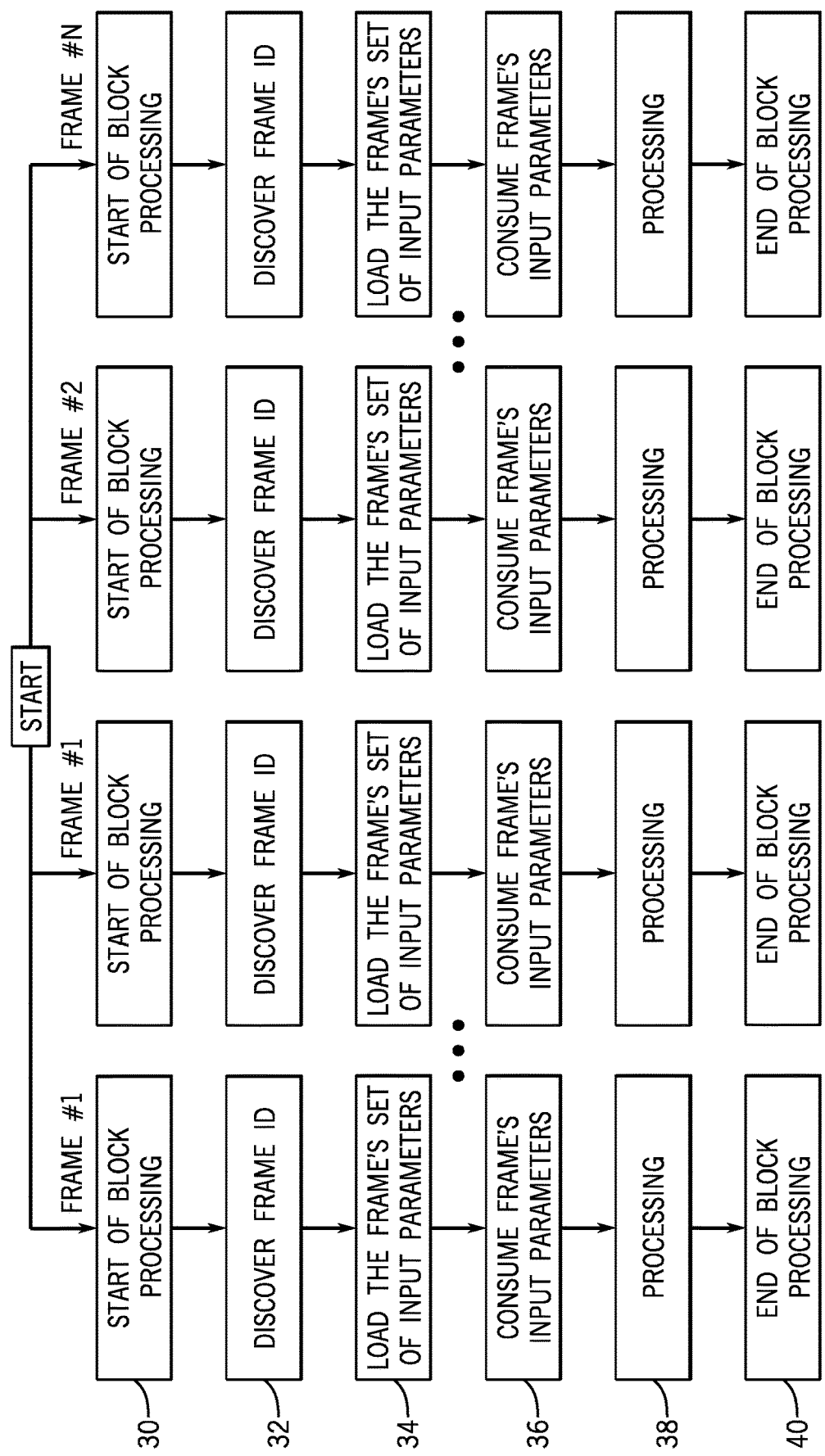
FIG. 3 is a depiction of a hardware embodiment.

FIG. 3 shows hardware execution according to one embodiment. The multiple columns indicate multiple blocks being executed in parallel. The first two columns are for two different blocks in the same frame. In this example, a frame is equal to a workload. The blocks 36, 38 and 40 represent the conventional method and the blocks 30, 32, and 34 represent the new logic added to implement the multi-context operation. After frame processing begins (block 30), the frame identifier (ID) is discovered (block 32). The input parameters for the identified frame are loaded (block 34). Then the frame's input parameters are processed (block 36). Then each block is processed (block 38) until completed (block 40).

Each column represents the processing flow of blocks in a single workload or frame that can be executed by execution units. If a block is processed by a single execution unit, then each column represents the work done by a single execution unit and the number of columns in FIG. 3 may be the same as the number of execution units in the system.

As the system increases the number of execution units, the number of columns is also increased. In existing methods, all active columns are processing the same frame and the rest of the columns would be idle. With the super workload processing, after starting (block 30), all the columns are utilized and each column of processing needs to discover the frame or workload identifier (block 32) from an explicit or implicit data provided to the execution units.

Then each execution unit obtains a corresponding frame is set up input parameters (block 34) prior to normal processing (blocks 36, 38, and 40). This allows all the execution units to process frames or blocks resulting in processing with higher effective frames per second in some embodiments.

For each application, such as video encoding, which has frame-to-frame dependency, those dependent frames cannot be executed in parallel. However, independent frames may be encoded from multiple streams or multiple groups of pictures (GOPs) within a single stream in parallel.

Figure 4:
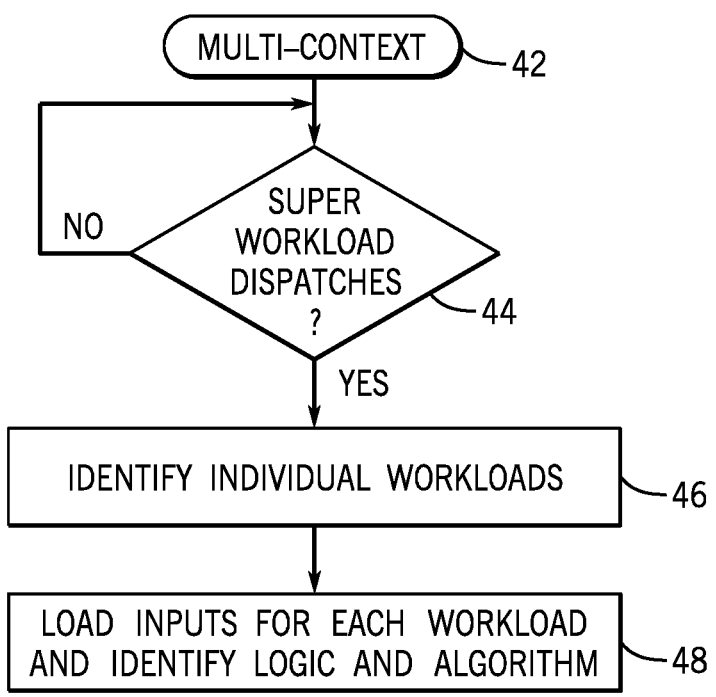
FIG. 4 is a flow chart for a combiner according to one embodiment.

Thus referring to FIG. 4, a sequence 42 for multi-context operation of a single context hardware processor may be implemented in software, firmware and/or hardware. In software and firmware embodiments it may be implemented by computer executed instructions stored in one or more non-transitory computer readable media such as magnetic, optical or semiconductor storage.

The sequence 42 begins by determining whether a super workload is dispatched as indicated in diamond 44. If so, the individual workloads are identified as indicated in block 46. Then the input for each workload are loaded and the logic and algorithm to be used as identified as indicated in block 48. The logic and algorithm may be, as examples, a video encoder, video processing, or different codec standards.

Figure 5:
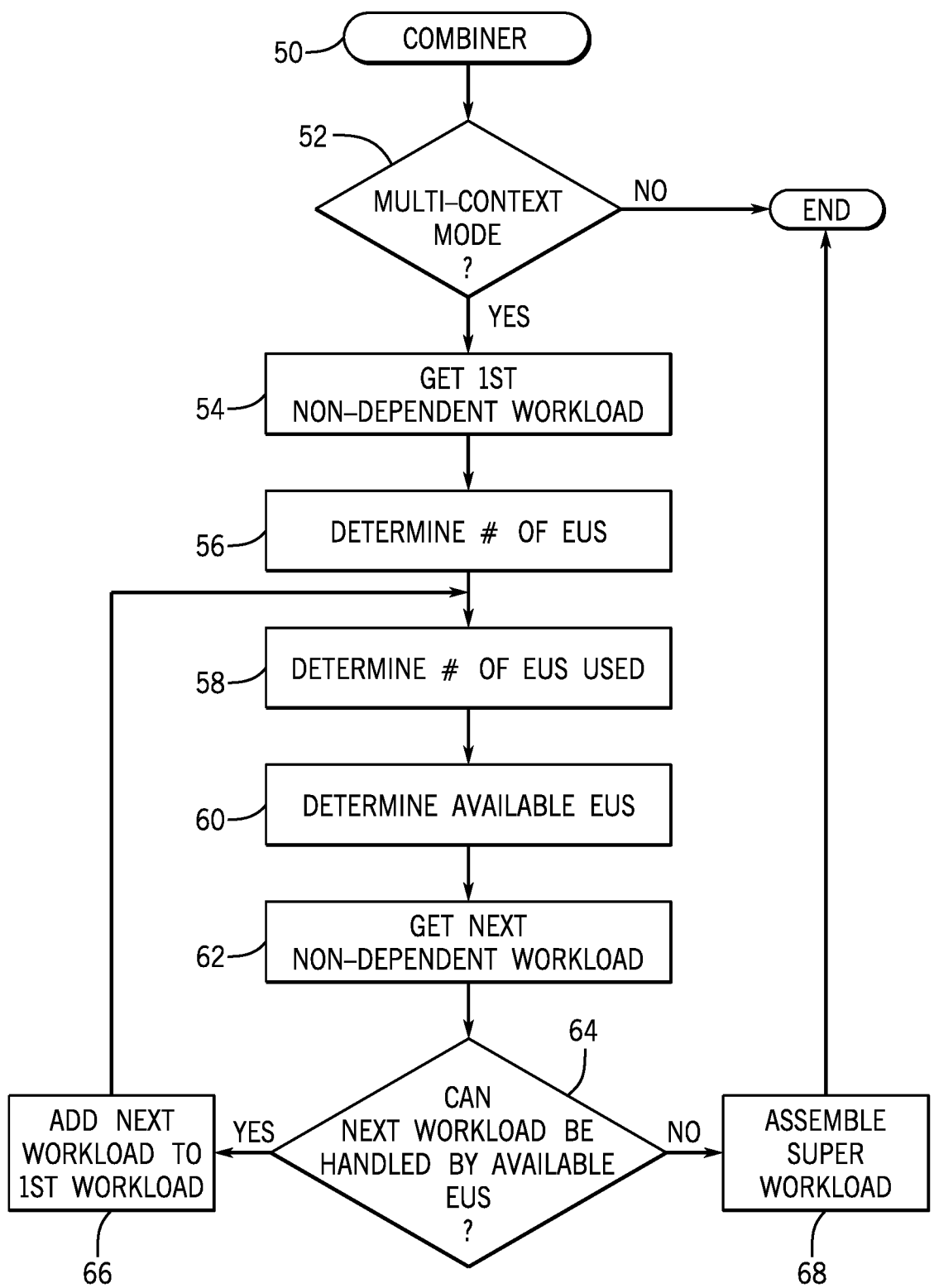
FIG. 5 shows a combiner flow for one embodiment.

A sequence 50 for the combiner, shown in FIG. 5, may be implemented in software, firmware and/or hardware. In software and firmware embodiments it may be implemented by computer executed instructions stored in one or more non-transitory computer readable media such as magnetic, optical or semiconductor storage.

The sequence 50 begins by detecting whether a multi-context mode has been enabled as indicated in block 52. If so, the first non-dependent workload is obtained as indicated in block 54. A non-dependent workload is a workload that does not need results from any other workload for its execution.

Then a check at block 56 determines a total number of execution units (EUs) available. In block 58, the number of execution units being used for the first workload is determined. Then at block 60 the number of available execution units is determined.

Thereafter, the next non-dependent workload is obtained as indicated in block 62. At diamond 64 a check determines whether the next workload can be handled by the available execution units within a workload size threshold. If so, the next workload is added to the first workload (block 66) and the flow iterates. Otherwise the super workload is assembled as indicated in block 68.

The techniques described herein may have applicability in any single context computer device including graphics processing units, central processing units, codecs, video processing circuits, and digital signal processors as examples.

In some cases, heterogeneous workloads can be combined into one super workload. For example, different distinct videos can be handled in the same super workload. As another example, workloads related to different coding standards such as Motion Pictures Experts Group (MPEG) and Advanced Video Coding (AVC) may be handled within the same workload.

In some embodiments, video encoding workloads may be assembled into super workloads. Also video processing workloads may be combined as super workloads. Examples of video processing workloads include frame rate conversion and video enhancement.

The control planes provide the auxiliary surface address to the main surface address to translation walks 24, 26, and 28. Whatever type of address is fed into the system by the client, the same type address is obtained after translation. Thus, if a tile resource virtual address is provided, a translated tile resource virtual address will be provided. Similarly if a virtual address is provided, a translated virtual address is provided as the output, mapping from one surface to another in the same address space where one surface is the auxiliary surface and the other surface is the main surface.

The pitch of the main surface is not aligned to any multiples of 4 kilobytes pages (tiles), and no padding of any kind may be allowed in some cases. Thus, the main surface row granularity may be 1 tile (4 KB page), and the auxiliary surface is then accessed in 16 byte chunks in one embodiment. For a given address in the main surface, a page walk is performed to get the pointer to the 16 byte auxiliary data chunk. These page tables may be populated by a driver at the time of auxiliary surface allocation.

The auxiliary surface translation walk 18, shown in more detail in FIG. 2, has a base pointer 30, programmed with the base address for the level 3 (L3) table 32. Some of the auxiliary surface address bits 34 (e.g. 47:36 or 12 bits) are used to index into the level 3 (L3) table 32 at 36 to give a pointer to the base address of the level 2 table 38. The level 2 table includes 4,096 pages in one embodiment and the level 3 table includes only one page, where a page is 64 kilobytes in one example. Then the next bits (e.g. next 12 bits or 35:24) in the auxiliary surface address 34 are used to index into the base address L2 table as indicated at 40. Thereafter the next bits (e.g. next 12 bits or 23:12) in the auxiliary address 34 are used to index from the base address level of (L1) table 42 into address 44 to get a pointer into an auxiliary or metadata chunk 46.

Ultimately, the L1 entry is read to get a pointer to the metadata chunk 46 which is in one embodiment a 16 byte chunk. Then a pointer from the first set of bits (e.g. bits 6 through 11) is used to identify two sets 48A and 48B of 4 bits each, one set for each cacheline.

A 3-level page walk is performed based on the main surface cacheline address. The base pointer for the L3 table is programmed by the corresponding engines command streamer. Each of the L3/L2/L1 tables may be 64 kilobytes in size, with each table holding 4K entries of 128 bits each. This page walk takes a virtual address (VA) or a tile resource virtual address (TRVA), and gives the pointer to the 16 byte auxiliary data chunk corresponding to the 4 KB page to which the original VA or TRVA belongs. This pointer to the 16 byte auxiliary data chunk is in the same address domain.

Referring to FIG. 3, the L3 table entry includes the L2 table base address and a valid indicator V. Likewise the L2 table entry includes L1 table base address and the valid indicator V. The L1 table entry may include the valid indicator V, the metadata of the 16 byte chunk address in one embodiment, and a seed/tile mode which indicates what type of tile structure is used and a header block base address which may be used to provide additional information in some embodiments about the compression technique.

The tile mode basically provides the organization of data in terms of x and y coordinates of the tiles of bits or pixels. In some embodiments multiple tile modes may be provided with different arrangements of data. This may be signified by the seed/tile mode indicator in the L1 table entry. This information is used for determining how to decompress the data.

Sequence 50 shown in FIG. 4 may be implemented in software, firmware, and/or hardware. In software and firmware embodiments it may be implemented computer executed instructions stored in one or more non-transitory computer readable media such as magnetic, optical or semiconductor storage.

The sequence begins by using a preprogrammed base pointer to locate the base address of a level 3 table as indicated in block 52. Then the sequence indexes into the L3 table using the upper bits of the auxiliary surface address as indicated in block 54. Next the L3 table is used to find the base address in the L2 table as indicated in block 56. The index into the L2 table is achieved by using intermediate bits of the auxiliary surface address. The intermediate bits are the next successive lower bits after the upper bits used in block 54. Thereafter the L2 table is used to locate the base address of the L1 table as indicated in block 60.

In block 62 the index into the L1 table is achieved using the lower bits of the auxiliary surface address. The lower bits are the next successive lower bits after the intermediate bits. Then the L1 cache is used to locate the auxiliary surface chunk as indicated in block 64. Finally an index into the auxiliary surface chunk is done in block 66 for each cacheline using the lowest bits of the auxiliary surface address. The lowest bits are the next lower bits after the lower bits of the auxiliary surface address.

Figure 6:
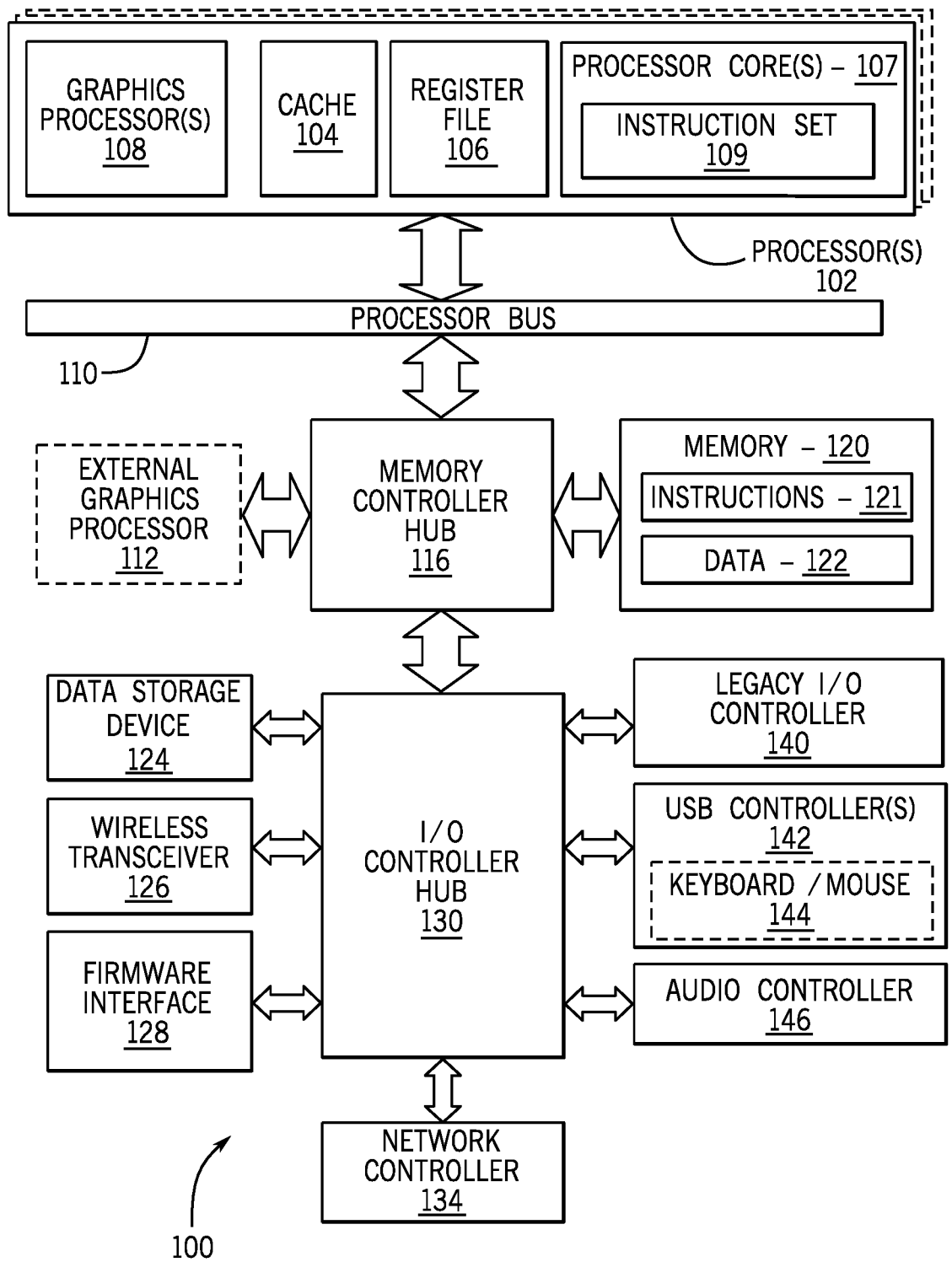
FIG. 6 is a block diagram of a processing system according to one embodiment.

FIG. 6 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

The processing system including a graphics processing unit may be an integrated circuit. An integrated circuit means a single integrated silicon die. The die contains the graphics processing unit and parallel interconnected geometry processing fixed-function units.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled with a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple with ICH 130. In some embodiments, a high-performance network controller (not shown) couples with processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 7:
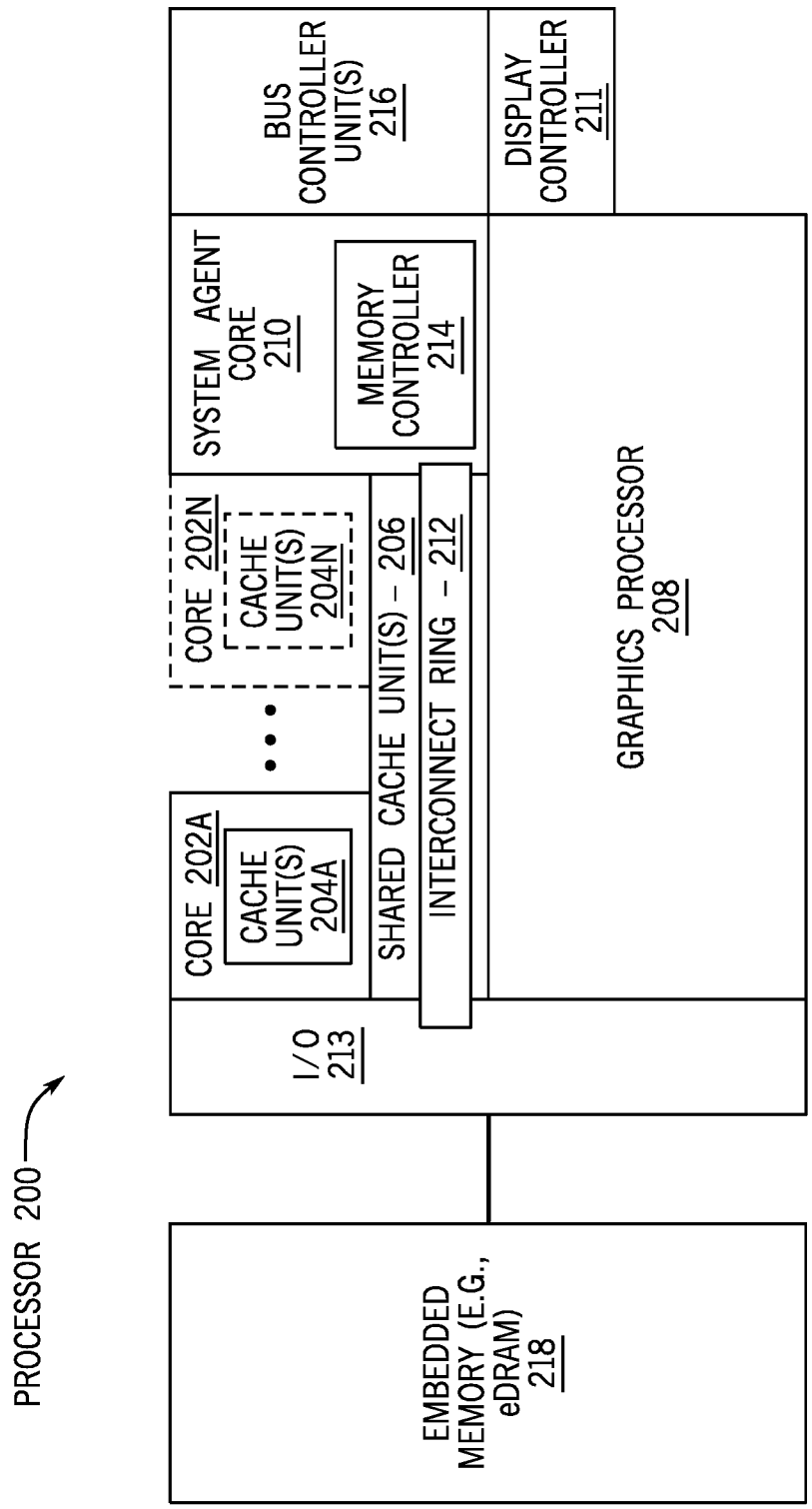
FIG. 7 is a block diagram of a processor according to one embodiment.

FIG. 7 is a block diagram of an embodiment of a processor 200 having one or more processor cores 202A-202N, an integrated memory controller 214, and an integrated graphics processor 208. Those elements of FIG. 7 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 8:
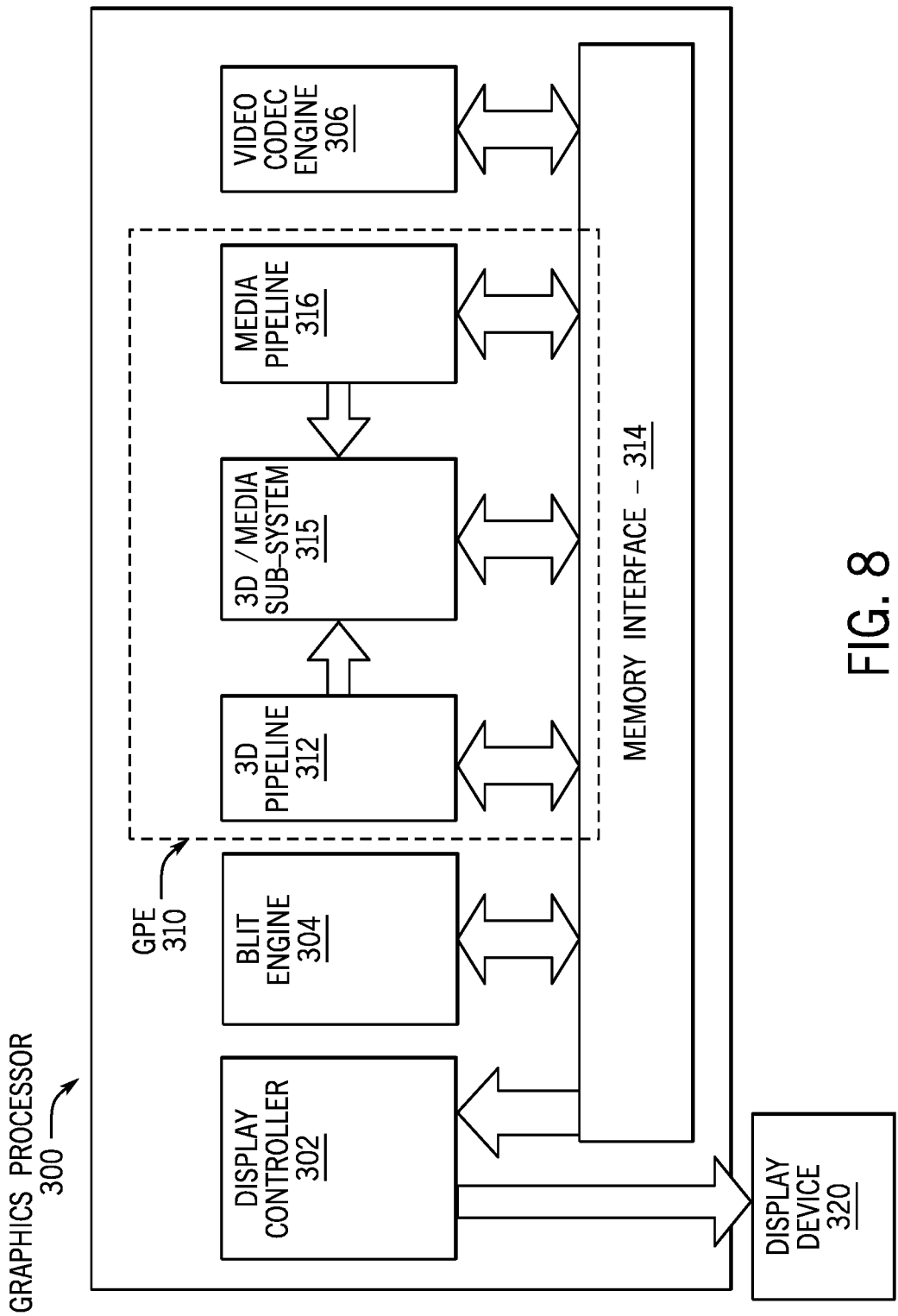
FIG. 8 is a block diagram of a graphics processor according to one embodiment.

FIG. 8 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Figure 9:
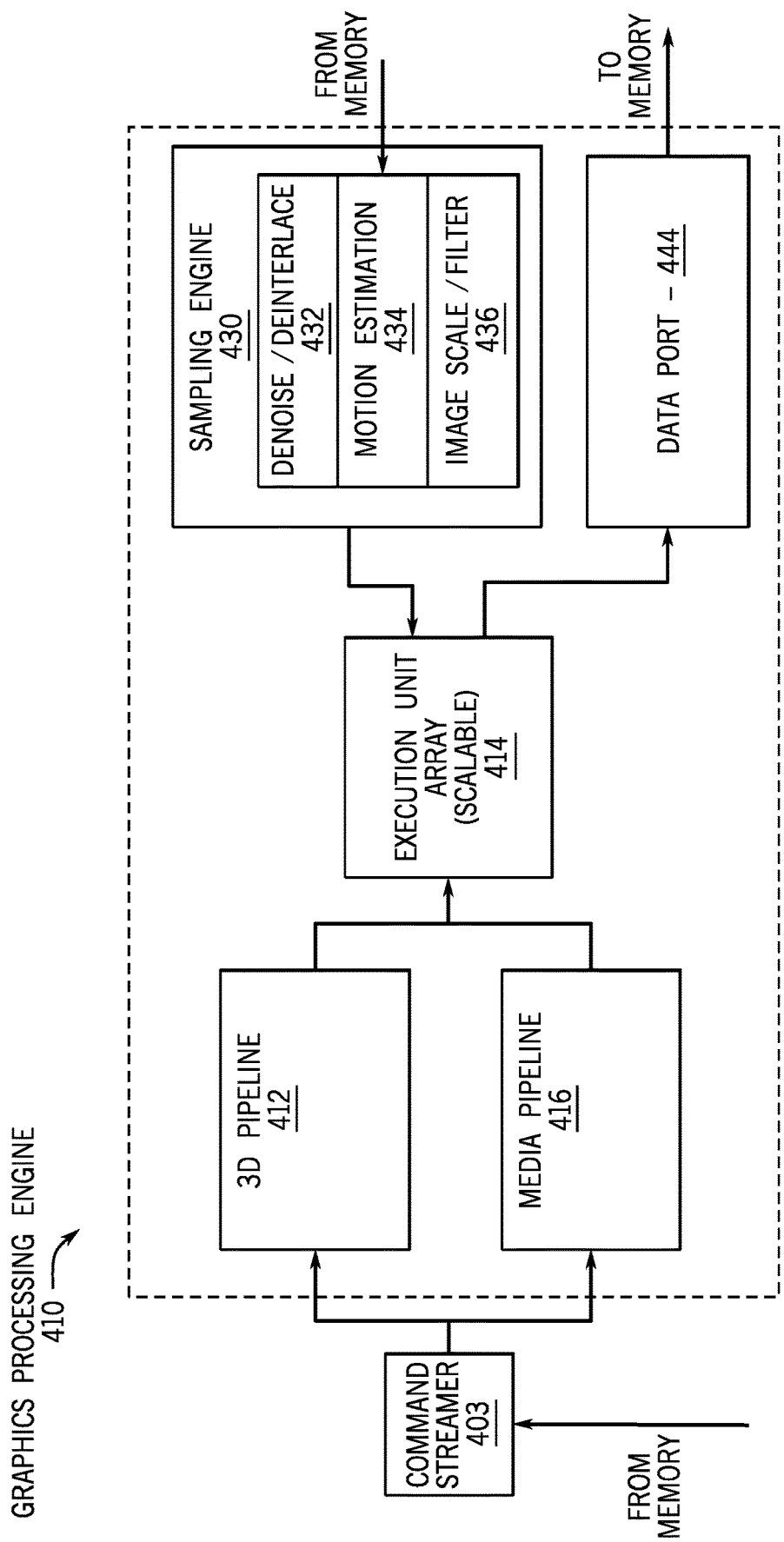
FIG. 9 is a block diagram of a graphics processing engine according to one embodiment.

FIG. 9 is a block diagram of a graphics processing engine 410 of a graphics processor in accordance with some embodiments. In one embodiment, the graphics processing engine (GPE) 410 is a version of the GPE 310 shown in FIG. 9. Elements of FIG. 9 having the same reference numbers (or names) as the elements of any other figure herein can operate or function in any manner similar to that described elsewhere herein, but are not limited to such. For example, the 3D pipeline 312 and media pipeline 316 of FIG. 8 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414.

In various embodiments the 3D pipeline 312 can execute one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources. Multi-purpose execution logic (e.g., execution units) within the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 6 or core 202A-202N as in FIG. 7.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420. A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies between embodiments.

Figure 10:
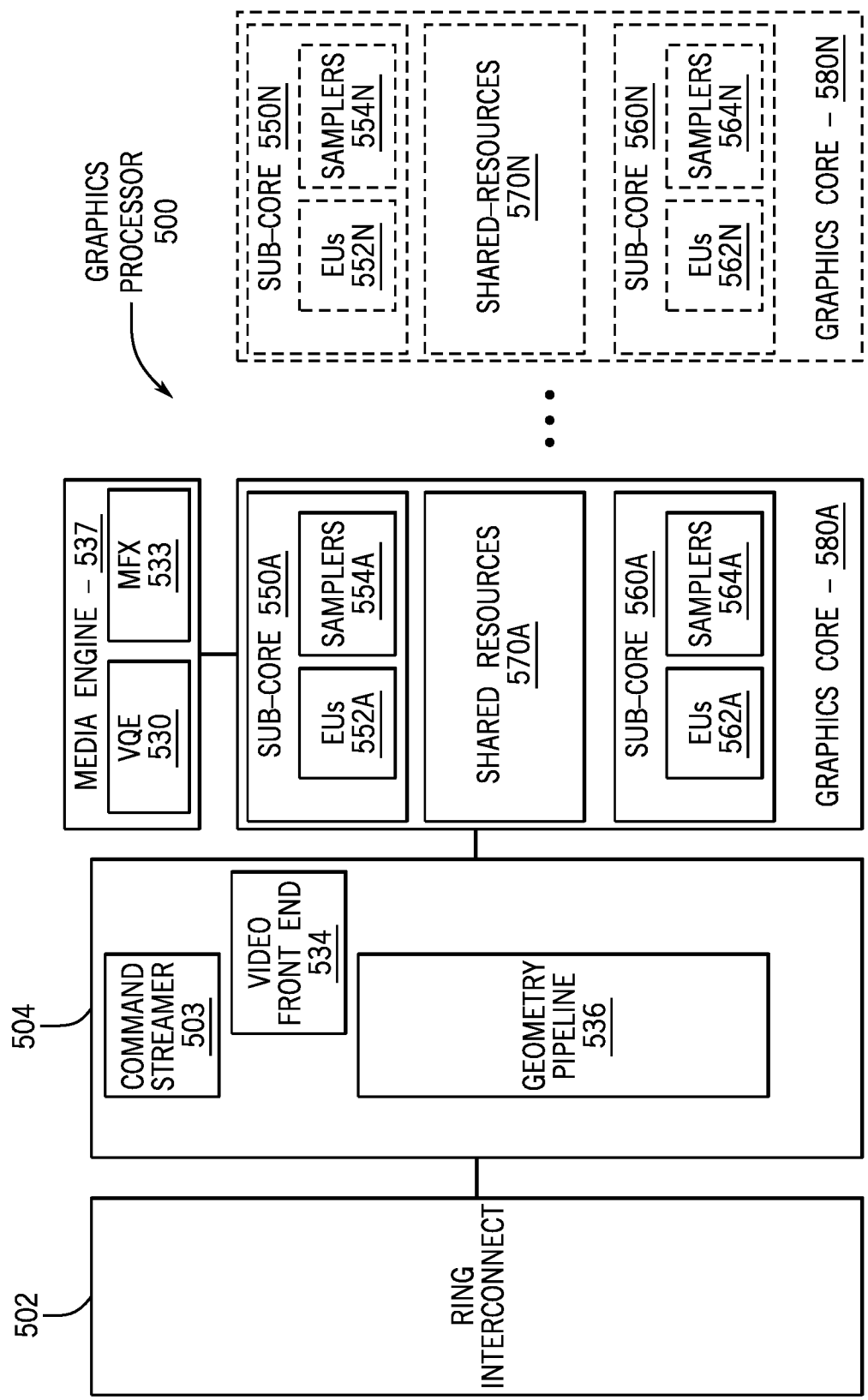
FIG. 10 is a block diagram of another embodiment of a graphics processor.

FIG. 10 is a block diagram of another embodiment of a graphics processor 500. Elements of FIG. 10 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 11:
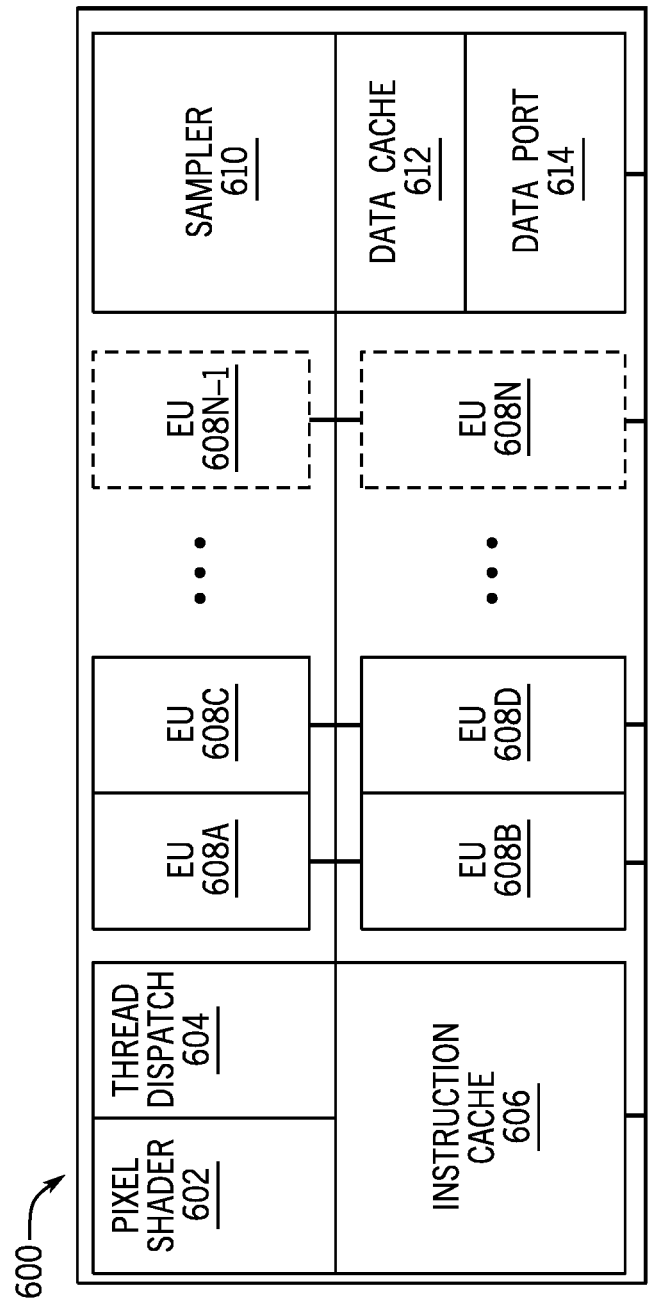
FIG. 11 is a depiction of thread execution logic according to one embodiment.

FIG. 11 illustrates thread execution logic 600 including an array of processing elements employed in some embodiments of a GPE. Elements of FIG. 11 having the same reference numbers (or names) as the elements of any other figure herein can operate or function in any manner similar to that described elsewhere herein, but are not limited to such.

In some embodiments, thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a standalone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, the geometry pipeline (e.g., 536 of FIG. 9) can dispatch vertex, tessellation, or geometry shaders to the thread execution logic 600 (FIG. 10) for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 12:
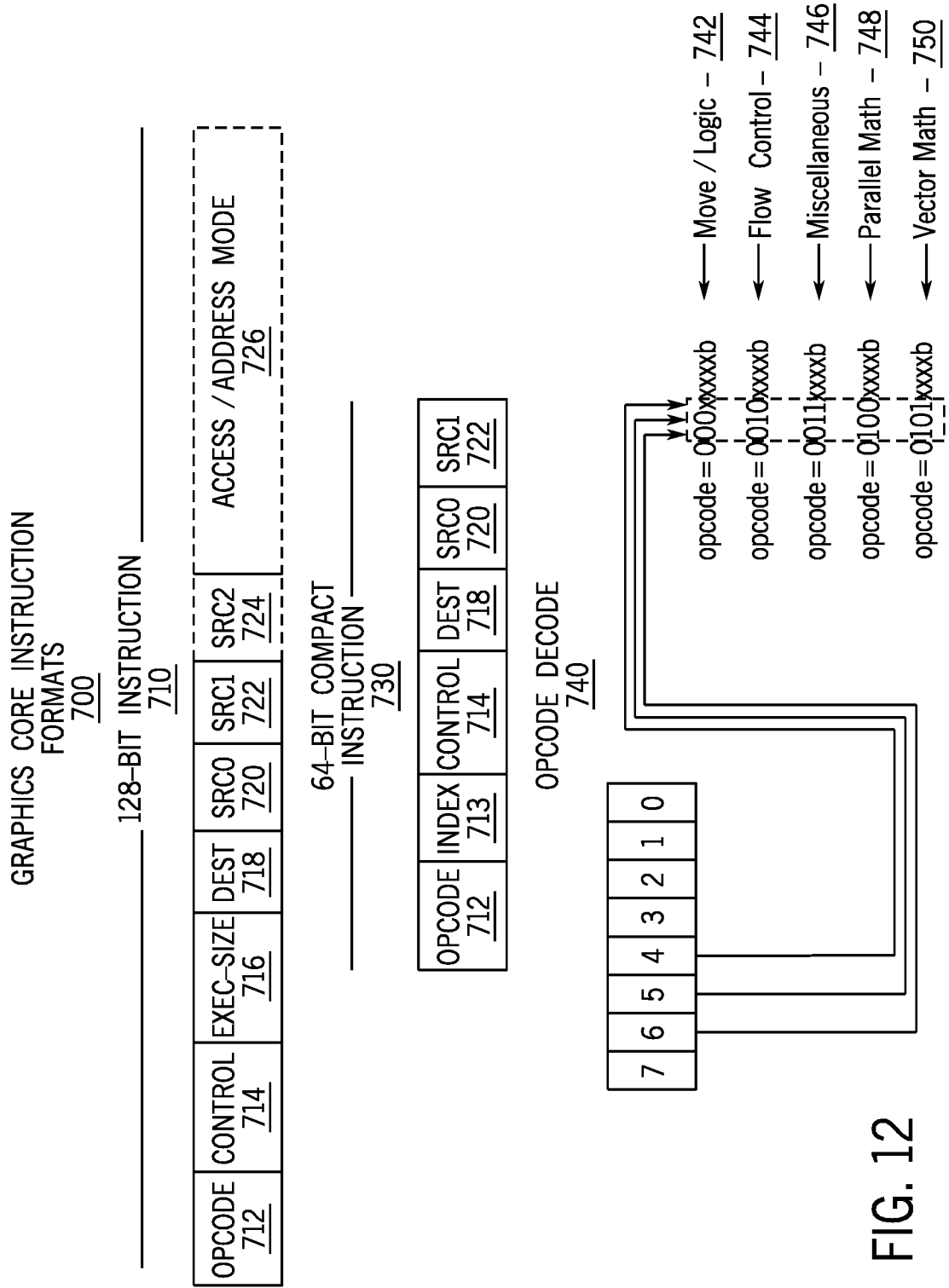
FIG. 12 is a block diagram of a graphics processor instruction format according to some embodiments.

FIG. 12 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit instruction format 730. The native instructions available in the 64-bit instruction format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 13:
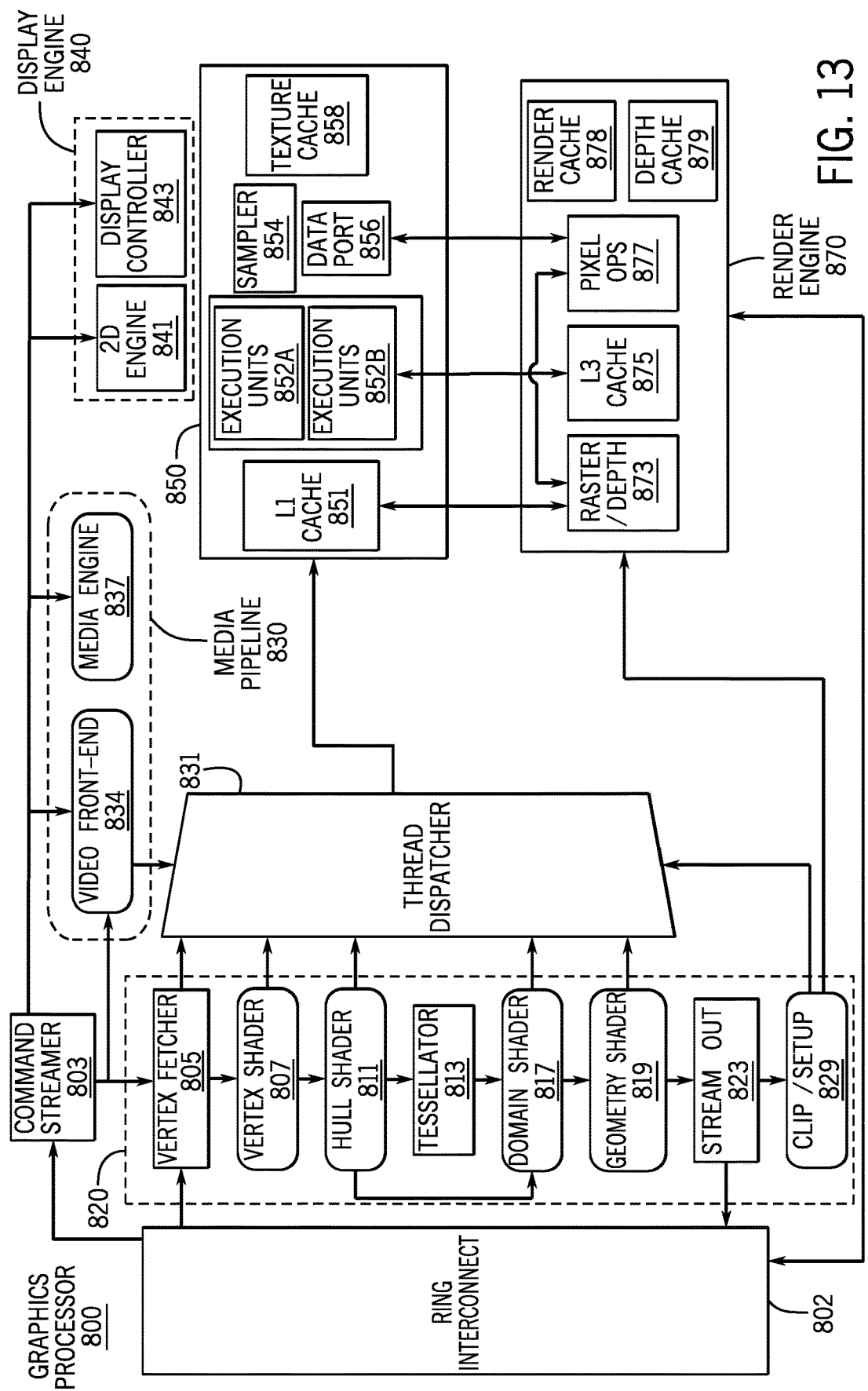
FIG. 13 is a block diagram of another embodiment of a graphics processor.

FIG. 13 is a block diagram of another embodiment of a graphics processor 800. Elements of FIG. 13 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A-852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Figure 14A:
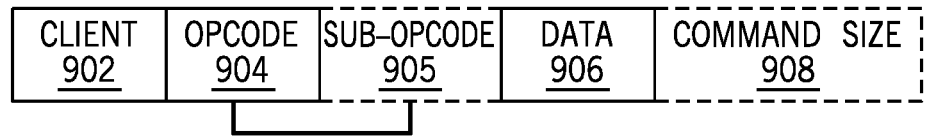
FIG. 14A is a block diagram of a graphics processor command format according to some embodiments.
Figure 14B:
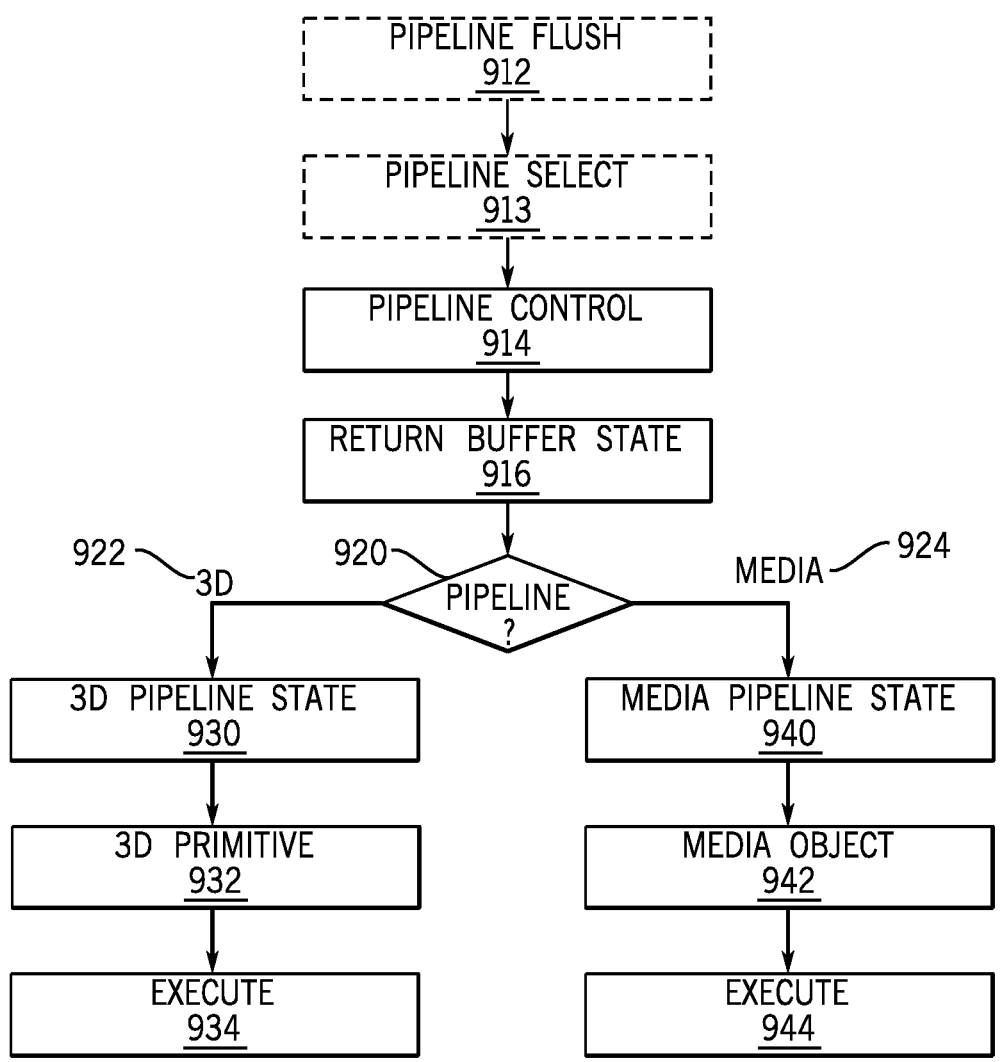
FIG. 14B is a block diagram illustrating a graphics processor command sequence according to some embodiments.

FIG. 14A is a block diagram illustrating a graphics processor command format 900 according to some embodiments. FIG. 14B is a block diagram illustrating a graphics processor command sequence 910 according to an embodiment. The solid lined boxes in FIG. 14A illustrate the components that are generally included in a graphics command while the dashed lines include components that are optional or that are only included in a sub-set of the graphics commands. The exemplary graphics processor command format 900 of FIG. 14A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 14B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands for the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, configuring the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Figure 15:
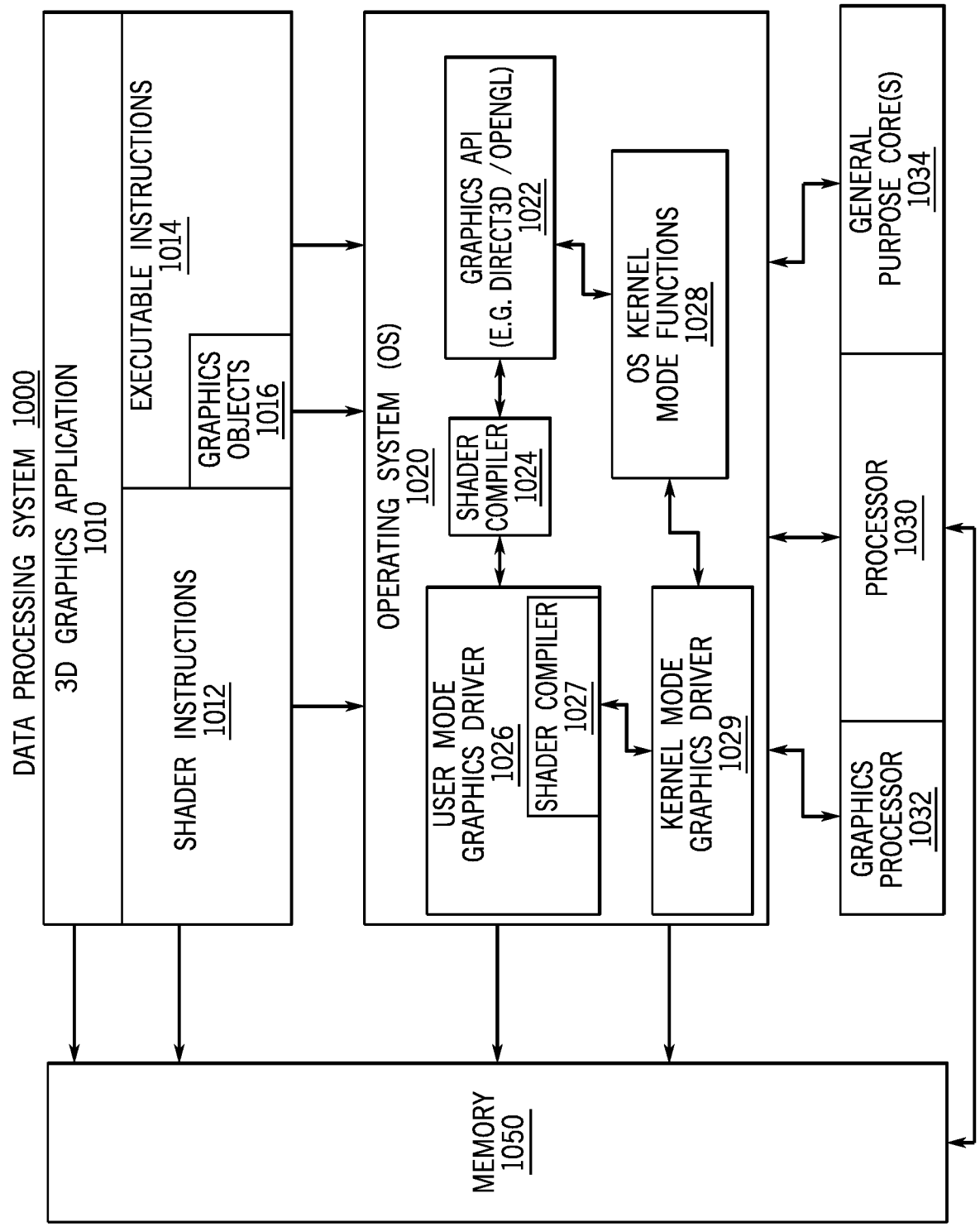
FIG. 15 is a depiction of an exemplary graphics software architecture according to some embodiments.

FIG. 15 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034.

The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 16:
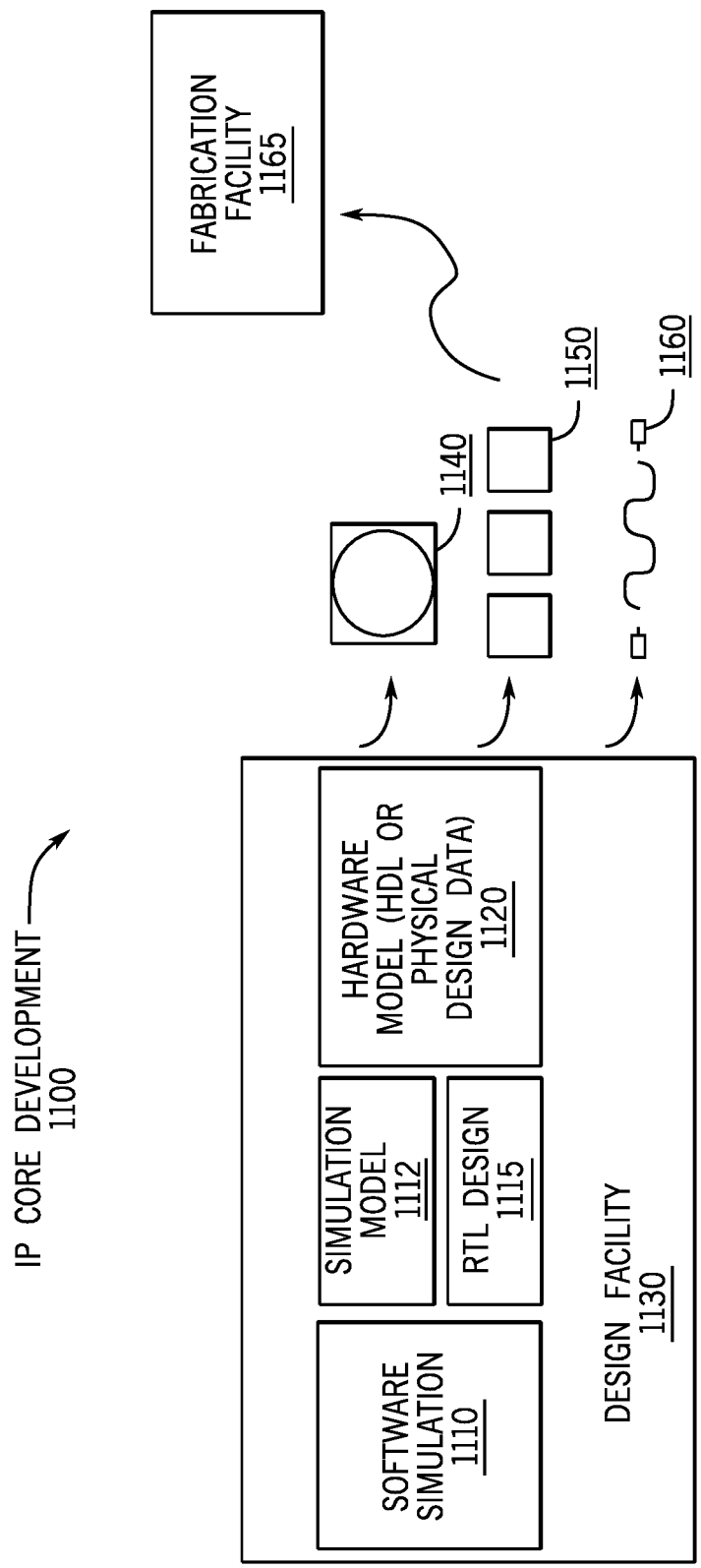
FIG. 16 is a block diagram illustrating an IP core development system according to some embodiments.

FIG. 16 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 17:
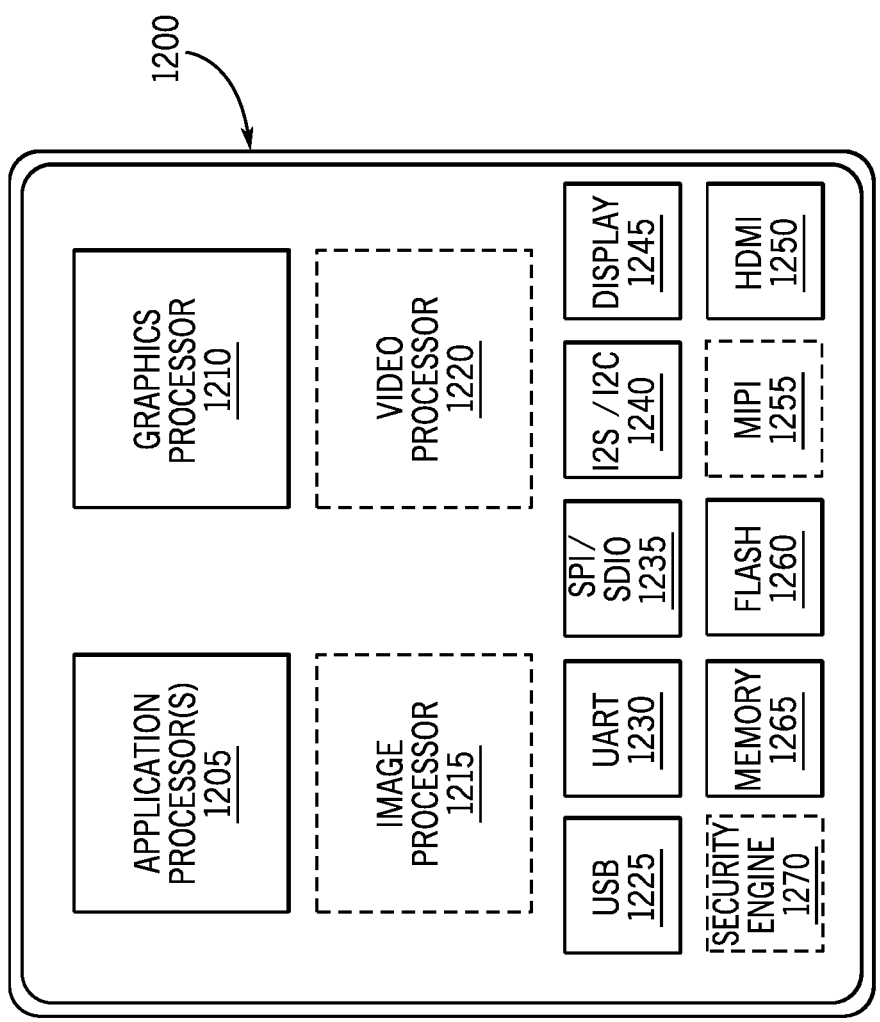
FIG. 17 is a block diagram showing an exemplary system on chip integrated circuit according to some embodiments.
Figure 18:
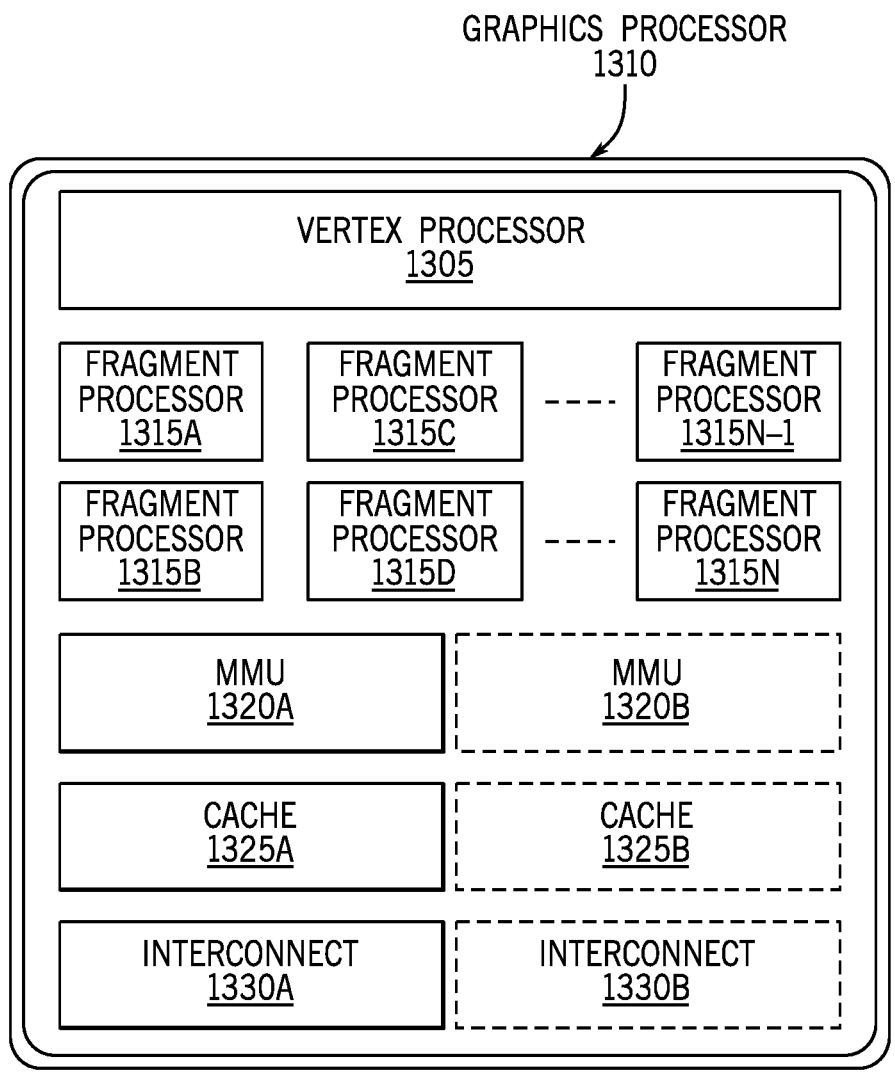
FIG. 18 is a block diagram of a graphics processor in a system on a chip according to one embodiment.
Figure 19:
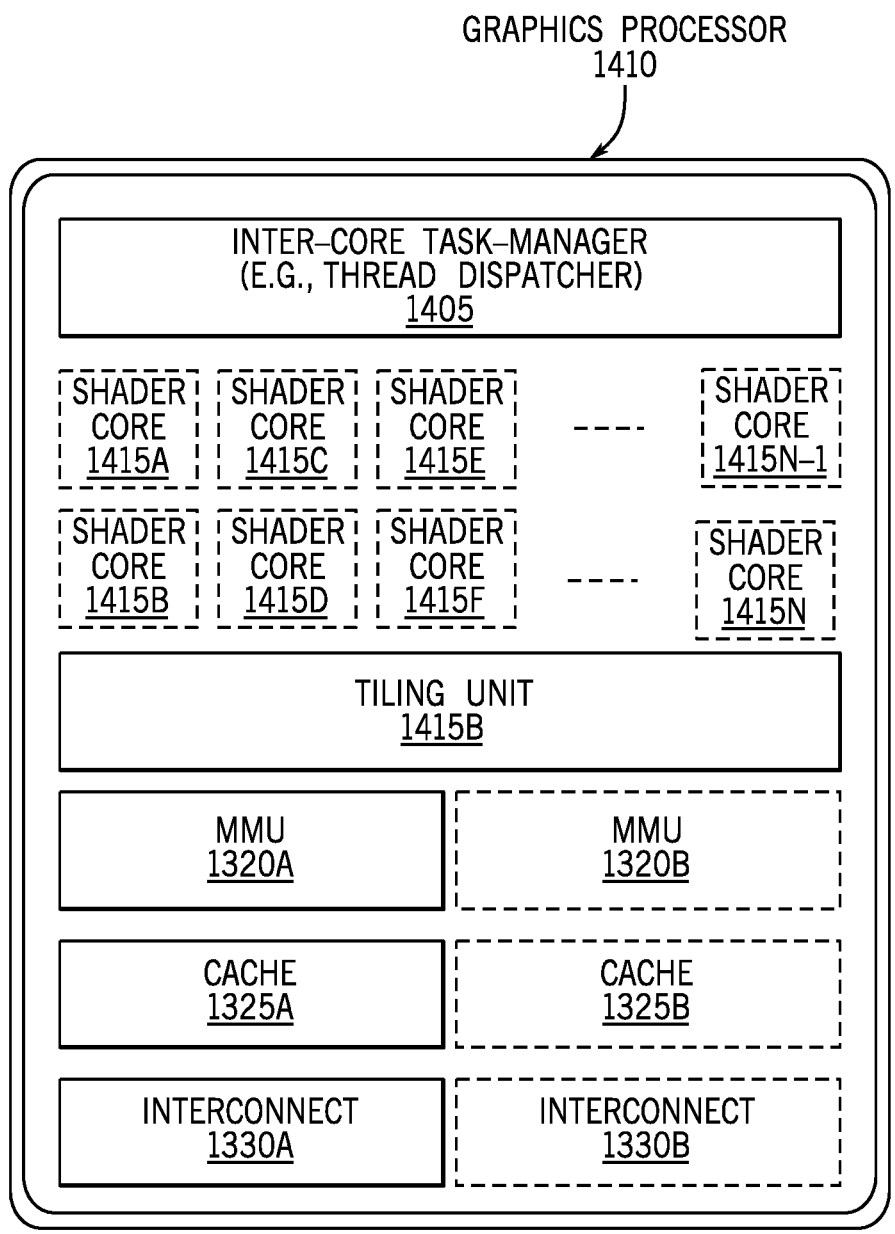
FIG. 19 is a block diagram of another graphics processor according to one embodiment.

FIGS. 17-19 illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 17 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 17 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 17. Graphics processor 1310 includes a vertex processor 1305 and one or more fragment processor(s) 1315A 1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 18, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 19 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 16. Graphics processor 1410 includes the one or more MMU(s) 1320A-1320B, cache(s) 1325A-1325B, and circuit interconnect(s) 1330A-1330B of the integrated circuit 1300 of FIG. 17.

Graphics processor 1410 includes one or more shader core(s) 1415A-1415N (e.g., 1415A, 1415B, 1415C, 1415D, 1415E, 1415F, through 1315N-1, and 1315N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1410 includes an inter-core task manager 1405, which acts as a thread dispatcher to dispatch execution threads to one or more shader core(s) 1415A-1415N and a tiling unit 1418 to accelerate tiling operations for tile-based rendering, in which rendering operations for a scene are subdivided in image space, for example to exploit local spatial coherence within a scene or to optimize use of internal caches.

The following clauses and/or examples pertain to further embodiments:

One example embodiment may be a method comprising assembling a plurality of non-dependent workloads in a single context of a hardware processor to create an assembled workload, identifying each of the constituent workloads in the assembled workload, and executing the assembled workload as a single context in said processor. The method may also include increasing a frame size to accommodate the assembled workload. The method may also include causing each of the workloads to identify themselves. The method may also include determining how many execution units are available for additional workloads. The method may also include determining how many workloads to assemble based on the number of available execution units. The method may also include dispatching the workloads in round robin fashion. The method may also include interleaving blocks of different workloads for execution. The method may also include encoding processing more than one frame in one assembled workload in single context hardware. The method may also include video processing more than one frame in one assembled workload in single context hardware. The method may also include combining heterogeneous workloads into one assembled workload.

In another example embodiment may be one or more non-transitory computer readable media storing instructions to perform a sequence comprising assembling a plurality of non-dependent workloads in a single context of a hardware processor to create an assembled workload, identifying each of the constituent workloads in the assembled workload, and executing the assembled workload as a single context in said processor. The media may also include further storing instructions to perform a sequence including increasing a frame size to accommodate the assembled workload. The media may also include further storing instructions to perform a sequence including causing each of the workloads to identify themselves. The media may also include further storing instructions to perform a sequence including determining how many execution units are available for additional workloads. The media may also include further storing instructions to perform a sequence including determining how many workloads to assemble based on the number of available execution units. The media may also include further storing instructions to perform a sequence including dispatching the workloads in round robin fashion. The media may also include further storing instructions to perform a sequence including interleaving blocks of different workloads for execution. The media may also include further storing instructions to perform a sequence including encoding processing more than one frame in one assembled workload in single context hardware. The media may also include further storing instructions to perform a sequence including video processing more than one frame in one assembled workload in single context hardware. The media may also include further storing instructions to perform a sequence including combining heterogeneous workloads into one assembled workload.

Another example embodiment may be an apparatus comprising a processor to assemble a plurality of non-dependent workloads in a single context of a hardware processor to create an assembled workload, identify each of the constituent workloads in the assembled workload, execute the assembled workload as a single context in said processor, and a memory coupled to said processor. The apparatus may include said processor to increase a frame size to accommodate the assembled workload. The apparatus may include said processor to cause each of the workloads to identify themselves. The apparatus may include said processor to determine how many execution units are available for additional workloads. The apparatus may include said processor to determine how many workloads to assemble based on the number of available execution units. The apparatus may include said processor to dispatch the workloads in round robin fashion. The apparatus may include said processor to interleave blocks of different workloads for execution. The apparatus may include said processor to encode processing more than one frame in one assembled workload in single context hardware. The apparatus may include said processor to video process more than one frame in one assembled workload in single context hardware. The apparatus may include said processor to combine heterogeneous workloads into one assembled workload.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   in response to determining that a multiple context mode is enabled in which a plurality of non-dependent workloads are executed concurrently, assembling the plurality of non-dependent workloads in a single context, each workload of the plurality of non-dependent workloads for one frame of a plurality of different frames, to create an assembled workload for execution by a single context graphics hardware system having a plurality of execution units when available execution units of the plurality of execution units cannot handle an additional non-dependent workload, wherein the single context graphics hardware system does not support multiple contexts;
   identifying each of the plurality of non-dependent workloads in the assembled workload; and
   concurrently executing in parallel each of the plurality of non-dependent workloads of the assembled workload as the single context on at least some of the plurality of execution units in said single context graphics hardware system.

2. The method of claim 1, wherein each workload is formed of a plurality of blocks included in the one frame of the plurality of different frames.

3. The method of claim 2, further comprising:
   dispatching the plurality of blocks of a first workload of the assembled workload comprising a first frame to a first set of execution units of the plurality of execution units, to cause the first set of execution units to concurrently execute the plurality of blocks of the first workload; and dispatching the plurality of blocks of a second workload of the assembled workload comprising a second frame to a second set of execution units of the plurality of execution units, to cause the second set of execution units to concurrently execute the plurality of blocks of the second workload.

4. The method of claim 1, further comprising determining whether an additional non-dependent workload can be handled by available execution units of the plurality of execution units.

5. The method of claim 4, further comprising creating the assembled workload when the available execution units cannot handle the additional non-dependent workload.

6. The method of claim 4, further comprising adding the additional non-dependent workload to the plurality of non-dependent workloads if the available execution units can handle the additional non-dependent workload.

7. The method of claim 1, further comprising increasing a frame size of the assembled workload to accommodate the plurality of non-dependent workloads.

8. The method of claim 1, further comprising interleaving a plurality of blocks of the frame of each of the plurality of non-dependent workloads in the single context.

9. The method of claim 1, further comprising encoding processing concurrently more than one frame in the assembled workload in the single context graphics hardware system.

10. The method of claim 9, further comprising encoding processing non-dependent workloads of at least two different coding standards in the assembled workload.

11. The method of claim 1, further comprising preventing different frames having frame-to-frame dependency from the concurrent executing.

12. The method of claim 1, further comprising video processing concurrently more than one frame in the assembled workload in the single context graphics hardware system.

13. The method of claim 1, further comprising combining heterogeneous workloads into the assembled workload, the heterogeneous workloads comprising different distinct videos.

14. At least one non-transitory computer readable storage medium having stored thereon instructions, which if performed by a machine cause the machine to perform a method comprising:
in response to determining that a multiple context mode is enabled in which a plurality of non-dependent workloads are executed concurrently, assembling the plurality of non-dependent workloads in a single context, each workload of the plurality of non-dependent workloads for one frame of a plurality of different frames, to create an assembled workload for execution by a single context graphics hardware system having a plurality of execution units when available execution units of the plurality of execution units cannot handle an additional non-dependent workload, wherein the single context graphics hardware system does not support multiple contexts;
identifying each of the plurality of non-dependent workloads in the assembled workload; and
concurrently executing in parallel each of the plurality of non-dependent workloads of the assembled workload as the single context on at least some of the plurality of execution units in said single context graphics hardware system.

15. The at least one non-transitory computer readable storage medium of claim 14, wherein each workload is formed of a plurality of blocks included in the one frame of the plurality of different frames.

16. The at least one non-transitory computer readable storage medium of claim 15, wherein the method further comprises:
dispatching the plurality of blocks of a first workload of the assembled workload comprising a first frame to a first set of execution units of the plurality of execution units, to cause the first set of execution units to concurrently execute the plurality of blocks of the first workload; and
dispatching the plurality of blocks of a second workload of the assembled workload comprising a second frame to a second set of execution units of the plurality of execution units, to cause the second set of execution units to concurrently execute the plurality of blocks of the second workload.

17. The at least one non-transitory computer readable storage medium of claim 14, wherein the method further comprises determining whether an additional non-dependent workload can be handled by available execution units of the plurality of execution units.

18. The at least one non-transitory computer readable storage medium of claim 17, wherein the method further comprises creating the assembled workload if the available execution units cannot handle the additional non-dependent workload.

19. The at least one non-transitory computer readable storage medium of claim 17, further comprising adding the additional non-dependent workload to the plurality of non-dependent workloads if the available execution units can handle the additional non-dependent workload.

20. The at least one non-transitory computer readable storage medium of claim 14, wherein the method further comprises interleaving a plurality of blocks of the frame of each of the plurality of non-dependent workloads in the single context.

21. The at least one non-transitory computer readable storage medium of claim 14, wherein the method further comprises combining heterogeneous workloads into the assembled workload, the heterogeneous workloads comprising different distinct videos.

22. An apparatus comprising:
a single context graphics hardware system comprising a plurality of execution units, wherein in response to a determination determining that a multiple context mode is enabled in which a plurality of non-dependent workloads are to execute executed concurrently, the single context graphics hardware system is to:
assemble the plurality of non-dependent workloads in a single context when available execution units of the plurality of execution units cannot handle an additional non-dependent workload, each workload of the plurality of non-dependent workloads for one frame of a plurality of different frames, to create an assembled workload;
identify each of the plurality of non-dependent workloads in the assembled workload; and
concurrently execute in parallel each of the plurality of non-dependent workloads of the assembled workload as the single context on at least some of the plurality of execution units, wherein the single context graphics hardware system does not support multiple contexts.

23. The apparatus of claim 22, wherein each workload is formed of a plurality of blocks included in the one frame of the plurality of different frames.

24. The apparatus of claim 23, wherein the single context graphics hardware system is further to:
- dispatch the plurality of blocks of a first workload of the assembled workload to a first set of execution units of the plurality of execution units, to cause the first set of execution units to concurrently execute the plurality of blocks of the first workload; and
- dispatch the plurality of blocks of a second workload of the assembled workload to a second set of execution units of the plurality of execution units, to cause the second set of execution units to concurrently execute the plurality of blocks of the second workload.

25. The apparatus of claim 22, wherein the single context graphics hardware system further is to determine whether an additional non-dependent workload can be handled by available execution units of the plurality of execution units.

26. The apparatus of claim 25, wherein the single context graphics hardware system is further to create the assembled workload if the available execution units cannot handle the additional non-dependent workload.

27. The apparatus of claim 25, wherein the single context graphics hardware system is further to add the additional non-dependent workload to the plurality of non-dependent workloads if the available execution units can handle the additional non-dependent workload.

28. The apparatus of claim 22, wherein the single context graphics hardware system is further to interleave a plurality of blocks of the frame of each of the plurality of non-dependent workloads in the single context.

29. The apparatus of claim 22, wherein the single context graphics hardware system is further to combine heterogeneous workloads into the assembled workload, the heterogeneous workloads comprising different distinct videos.

* * * * *

UNITED STATES PATENT AND TRADEMARK OFFICE
CERTIFICATE OF CORRECTION

| | |
|---|---|
| PATENT NO. | : 11,150,943 B2 |
| APPLICATION NO. | : 15/482912 |
| DATED | : October 19, 2021 |
| INVENTOR(S) | : Changwon D. Rhee et al. |

It is certified that error appears in the above-identified patent and that said Letters Patent is hereby corrected as shown below:

In the Claims

Column 28:
Line 47, "determination determining" should be --determination--; and
Line 49, "execute executed" should be --execute--.

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*